United States Patent
Sethapun et al.

(10) Patent No.: US 11,919,645 B2
(45) Date of Patent: Mar. 5, 2024

(54) LOCKING AIRCRAFT STORAGE COMPARTMENT AND BED PLATFORM

(71) Applicant: Gulfstream Aerospace Corporation, Savannah, GA (US)

(72) Inventors: Kevin Sethapun, Savannah, GA (US); Terry Baker, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 233 days.

(21) Appl. No.: 15/929,852

(22) Filed: May 26, 2020

(65) Prior Publication Data

US 2021/0371111 A1 Dec. 2, 2021

(51) Int. Cl.
*B64D 11/06* (2006.01)
*B64D 11/00* (2006.01)

(52) U.S. Cl.
CPC ........ *B64D 11/0636* (2014.12); *B64D 11/003* (2013.01); *B64D 2011/0069* (2013.01)

(58) Field of Classification Search
CPC ............ B64D 11/0627; B64D 11/0629; B64D 11/0632; B64D 11/0633; B64D 11/0636; B64D 11/003; B64D 2011/0069; B64D 11/604; B64D 11/0641; A47C 17/50; A47C 17/54; A47C 17/84; A47C 17/86; A47C 19/22; E05C 17/30; E05C 9/08;
(Continued)

(56) References Cited

U.S. PATENT DOCUMENTS

| 3,789,550 | A | * | 2/1974 | Seiwert | .................. | E05C 1/145 |
| | | | | | | 292/DIG. 31 |
| 4,079,988 | A | * | 3/1978 | Randall | ................. | B60P 1/4471 |
| | | | | | | 296/57.1 |
| 9,055,823 | B1 | * | 6/2015 | Jannetides | ............. | A47C 19/22 |

(Continued)

FOREIGN PATENT DOCUMENTS

| DE | 102008025232 A1 | * | 12/2009 | ........... | B64D 11/003 |
| EP | 1647483 A1 | * | 4/2006 | ............ | B64D 11/06 |

(Continued)

OTHER PUBLICATIONS

"Yale P5201N01 Navis Paddle Lever, Hands-free opening—Push with your hip, Privacy, Satin Nickel," Aug. 21, 2018, Yale Security. (Year: 2018).*

*Primary Examiner* — Joshua J Michener
*Assistant Examiner* — Ryan Andrew Yankey
(74) *Attorney, Agent, or Firm* — LKGLOBAL | Lorenz & Kopf LLP (57) ABSTRACT

The present application relates to providing an aircraft storage container including a lower portion having a horizontal bottom and a plurality of vertical sides configured to form a storage volume, an upper portion rotationally coupled to one of the plurality of vertical sides, a gas piston having a locking mechanism wherein the gas piston is coupled between the lower portion and the upper portion, the gas piston being configured to support the upper portion when the locking mechanism is engaged, a rotational member operative to disengage the locking mechanism when rotated and to engage the locking mechanism when released, and a latch mechanism having a rotational lever, wherein the latch mechanism is operative to rotate the rotational member in response to a pressure on the rotational lever.

9 Claims, 5 Drawing Sheets

(58) Field of Classification Search
CPC ............. Y10T 929/28; Y10T 292/0834; Y10T 292/0848; F16F 9/0254
See application file for complete search history.

(56) References Cited

U.S. PATENT DOCUMENTS

| | | | | |
|---|---|---|---|---|
| 2006/0230795 | A1* | 10/2006 | Kroening | E05C 9/08 70/159 |
| 2013/0019402 | A1* | 1/2013 | Vervoort | A47C 17/86 5/412 |
| 2014/0054920 | A1* | 2/2014 | Jeffries | E05B 83/16 292/202 |
| 2017/0297714 | A1* | 10/2017 | Schneider | B64D 11/0015 |
| 2022/0250752 | A1* | 8/2022 | Chandra | B60N 2/77 |

FOREIGN PATENT DOCUMENTS

| | | | | |
|---|---|---|---|---|
| EP | 3480108 A1 * | 5/2019 | | B64C 1/1423 |
| ES | 1064308 U * | 3/2007 | | B64D 11/06 |
| WO | WO-2008099404 A1 * | 8/2008 | | B25H 3/02 |
| WO | WO-2018100451 A1 * | 6/2018 | | A47C 17/86 |
| WO | WO-2018116317 A1 * | 6/2018 | | E05C 17/042 |

* cited by examiner

LOCKING AIRCRAFT STORAGE COMPARTMENT AND BED PLATFORM

BACKGROUND

The present disclosure relates generally to fixtures and storage with an aircraft passenger compartment. More specifically, aspects of this disclosure relate to systems, methods and devices for providing a secure storage volume within an aircraft passenger compartment having access provided by a hinged top portion wherein the top portion includes a secure locking mechanism and support for a mattress.

In a small space, such as within an aircraft, storage space is at a premium. The interior configuration of an aircraft is typically optimized to facilitate the greatest amount of passenger space. Most aircraft storage space, such as baggage compartments, are under the passenger floor of the aircraft and often cannot be accessed from the aircraft cabin. Thus, storage space within the passenger cabin that is accessible during aircraft operation is desirable and no unused volume is overlooked, such as overhead storage, under seat storage, storage within armrests, and the like Some aircraft provide beds for passengers. These beds are typically placed on a platform or podium to raise the bed level to a comfortable level above the aircraft floor. To provide secure storage under the platform where contents of the storage volume cannot slide out during aircraft operations, drawers have often been used to provide the storage. However, drawers often leave unused volume with the platform due to the drawer mechanisms and limitations on the size and depth of the drawers. Easy access to the remainder of the storage space is not possible without moving the mattress and bedding. It would be desirable to provide easy access to all of the space within the bed platform in order to overcome the aforementioned problems and to enable aircraft occupants to utilize the maximum amount of storage space within the aircraft while still providing convenient access and secure storage of items during aircraft operation.

The above information disclosed in this background section is only for enhancement of understanding of the background of the invention and therefore it may contain information that does not form the prior art that is already known in this country to a person of ordinary skill in the art.

SUMMARY

Disclosed herein are fixtures, devices and systems and for providing secure storage space within an aircraft, methods for making and methods for operating such systems, and vehicles equipped with such systems. By way of example, and not limitation, there is presented an aircraft with an onboard mattress support platform and providing a secure storage volume within the support platform.

In accordance with an aspect of the present disclosure, an apparatus including, but not limited to, a lower portion including a bottom and a plurality of sides wherein the bottom and the plurality of sides define a storage volume, an upper portion rotationally coupled to one of the plurality of sides where the upper portion is configured to enclose the storage volume when the upper portion is positioned in a closed position and to provide access to the storage volume when the upper portion is in an open position, a locking gas strut coupled between the upper portion and the lower portion having a locking mechanism wherein the locking gas strut is locked when the locking mechanism is engaged and the locking gas strut is unlocked when the locking mechanism is disengaged, a latch mechanism coupled to the upper portion configured with a rotational lever wherein the rotational lever is operative to rotate in an upward direction and a downward direction, a rotational shaft coupled to the rotational lever wherein the rotational shaft is operative to disengage the locking mechanism when the rotational lever is rotated in the upward direction and the downward direction.

In accordance with another aspect of the present disclosure a method for opening a storage container having an upper portion and a lower portion wherein the lower portion includes a bottom and a plurality of sides wherein the bottom and the plurality of sides define a storage volume and wherein the upper portion is rotationally coupled to one of the plurality of sides where the upper portion is configured to enclose the storage volume when the upper portion is positioned in a closed position and to provide access to the storage volume when the upper portion is in an open position and a locking gas strut coupled between the upper portion and the lower portion having a locking mechanism wherein the locking gas strut is locked when the locking mechanism is engaged and the locking gas strut is unlocked when the locking mechanism is disengaged including applying an upward pressure to a rotational lever wherein the rotational lever forms a portion of a latch mechanism coupled to the upper portion, and a rotational shaft coupled to the rotational lever wherein the rotational shaft is operative to disengage the locking mechanism when the rotational lever is rotated in the upward direction and the downward direction, and apply an upward pressure on the upper portion to provide access to the storage volume.

In accordance with another aspect of the present disclosure an aircraft storage container including a lower portion having a horizontal bottom and a plurality of vertical sides configured to form a storage volume wherein the horizontal bottom is mechanically affixed to at least one aircraft seat track, an upper portion rotationally coupled to one of the plurality of vertical sides wherein the upper portion forms an upper horizontal side of the storage volume when the upper portion is in a closed position and provides access to the storage volume when the upper portion is in an open position, a gas piston having a locking mechanism wherein the gas piston is coupled between the lower portion and the upper portion, the gas piston being configured to support the upper portion when the locking mechanism is engaged, a rotational member operative to disengage the locking mechanism when rotated and to engage the locking mechanism when released, and a latch mechanism having a rotational lever, wherein the latch mechanism is operative to rotate the rotational member in response to a pressure on the rotational lever.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
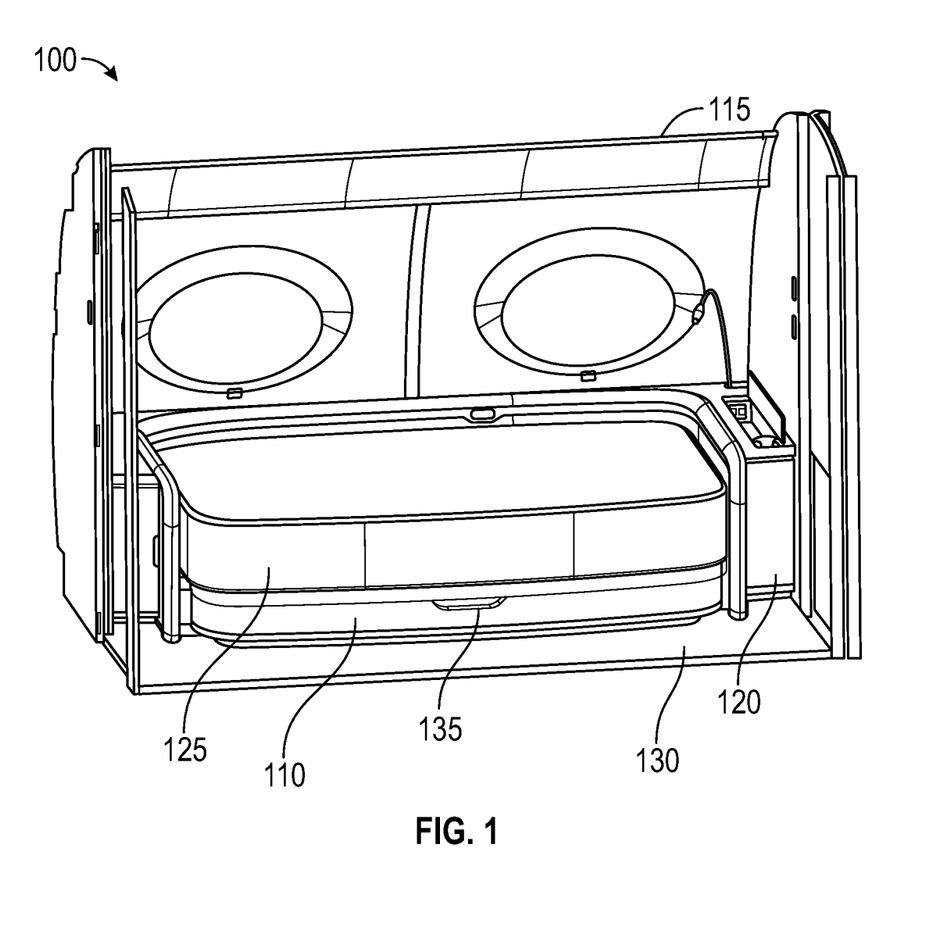
FIG. 1 shows an exemplary operating environment for providing locking aircraft storage compartment and bed platform according to an exemplary embodiment.

FIG. 1 schematically illustrates an exemplary operating environment 100 for providing locking aircraft storage compartment and bed platform 110 according to an exemplary embodiment of the present disclosure. The exemplary operating environment 100 depicts a bed platform 110 including an interior storage volume positioned within a surround fixture 120 wherein the surround fixture 120 may further include additional storage compartments, electrical outlets or interfaces, lighting devices and the like. The bed platform 110 is operative for supporting a mattress 125. In this exemplary embodiment, the surround fixture 120 may be mounted proximate to an aircraft passenger compartment wall 115. Further, the storage platform 110 may be mounted to an aircraft passenger compartment floor 130 using station fittings that are engaged into seat tracks that are fastened to an aircraft passenger compartment floor 130. In one exemplary embodiment, the seat tracks run the length of the passenger compartment from the front to the back of the compartment and are typically used to fasten passenger seats into the aircraft. In some aircraft configurations, these seat tracks may be used to fasten other aircraft furniture, such as tables, couches, storage compartments, chairs, and the like. Some aircraft furniture, such as cabinets and storage compartments may be fastened to the seat tracks using station fittings which have a mechanism on one end to engage the seat track and a second mechanism on the opposite end to engage the aircraft furniture. In one exemplary embodiment, these station fittings may resemble furniture legs with the mechanism to engage the seat track at the bottom of the leg and the mechanism to engage the furniture, such as a bolt flange or template, on the top of the leg.

The bed platform 110 may further include a latching assembly 135 for providing access the interior storage. In one exemplary embodiment, the latching assembly 135 may include a paddle like lever for activating the latching assembly 135. For example, pushing up on the lever may allow a top portion of the bed platform 120 to be lifted along with the mattress 125 to allow access to the interior storage volume. Pushing down on the lever may allow the top portion of the bed platform 120 to be lowered to close the interior volume. In this exemplary embodiment, releasing the lever will allow the lever to be returned to a neutral position and will fix the top portion of the bed platform 120 at the current position. Thus, pushing up on the lever and lifting the top portion to a first position and then releasing the lever will result in the top portion remaining at the first position. The lifting of the top portion of the bed platform may be aided by locking gas springs or locking gas struts.

Figure 2:
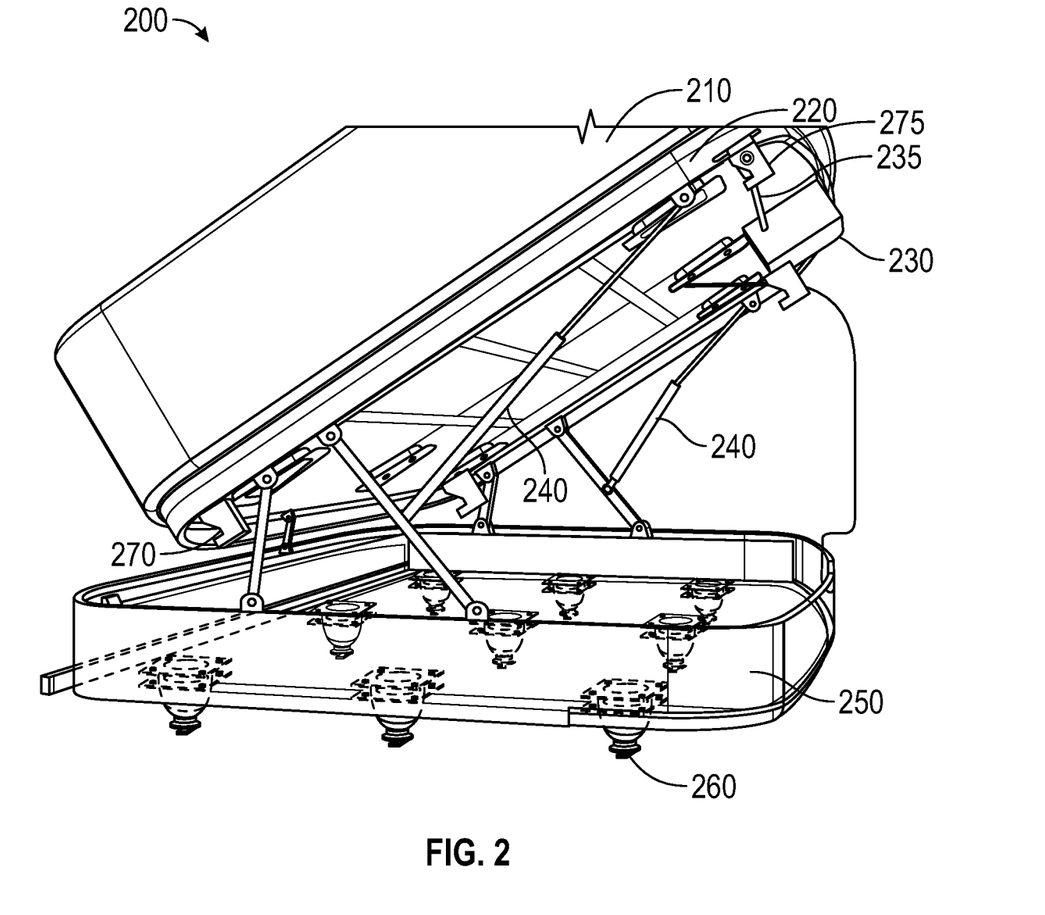
FIG. 2 shows an exemplary apparatus for providing locking aircraft storage compartment and bed platform according to an exemplary embodiment.

Turning now to FIG. 2, an exemplary apparatus for providing locking aircraft storage compartment and bed platform 200 according to an exemplary embodiment of the present disclosure is shown. In this exemplary embodiment, the bed platform 200 as described with respect to FIG. 1 includes a lower portion 250 and a top portion 220. The lower portion 250 includes a bottom and four sides to provide the interior storage volume. One edge of the top portion 220 is rotationally attached to one of the sides of the lower portion 250 with hinges, or the like, such that the top portion 220 rotates around an axis defined by the upper edge of the one side of the lower portion 250. In one exemplary embodiment, the top portion 220 is operative to rotate between an open position where the top portion is in a substantially vertical position and access is provided to the interior volume, and a closed position, where the top portion 220 is in contact with all four of the sides of the lower portion 250 thereby enclosing the interior volume. In this exemplary embodiment, the one side of the lower portion 220 is connected to the top portion is located towards a wall for the aircraft such that interior volume may be easily accessed by an aircraft occupant when the top portion 220 is in the open position. In addition, a mattress 210 or other cushion may be attached to the top portion 220 such that when the top portion 220 is in the closed position, the mattress 210 forms a horizontal surface for sitting or sleeping.

In this exemplary embodiment, the latch mechanism 230 further includes the lever wherein activation of the lever is operative to rotate one or more rotational shafts 235. The rotational shafts 235 may be operative to unlock the one or more gas struts 240. When the lever within the latch mechanism 230 is pushed up, the gas struts 240 may aid in lifting the top portion 220 by providing a lift assist feature by exerting a linear force between the lower portion 220 and the top portion 220. When the lever is released to return to the default position, the rotational shafts 235 are returned to their original positions thereby returning the gas struts 240 to the locked position. At this time, the top portion 220 will remain at its current position, being held in position by the locked gas struts 240. The exemplary bed platform 200 may further be supported and affixed to the aircraft using one or more station fittings 260. In this exemplary embodiment, the station fittings 260 may include a mechanism to engage a seat track at the bottom of the station fittings 260 and a mechanism such as a bolt flange or bolt template to engage the lower portion 250 of the bed platform on the top of the station fittings 260.

In addition to the latch mechanism 230 and locking gas struts 240, the exemplary system 200 may further include one or more retention hooks 270 which are engaged when the top portion 220 is moved to the closed position. These retention hooks 270 are configured to engage a corresponding receptacle or socket. In this exemplary embodiment, the top portion is equipped with four retention hooks 270, 275. Two of the retention hooks 270 may be fixed in position and located proximate to the rotational edge of the top portion 220. The fixed retention hooks may be engaged in their corresponding receptacles by the motion of closing the top portion 220. Two additional retention hooks 275 may be located proximate to the edge of the top portion 220 with the latch mechanism 230. The two additional retention hooks 275 may be rotational and coupled to the rotational shafts 235. When the rotational shafts 235 are rotated in response to activation of the lever within the latch mechanism 230 in order to lift the top portion, the rotational retention hooks may be disengaged allowing the top portion 220 to be lifted. When the rotational shafts 235 are rotated in response to activation of the lever within the latch mechanism 230 in order to lower the top portion, the rotational retention hooks 275 may be rotated allowing the top portion 220 to be fully closed such that when the lever within the latch mechanism 230 is released when the top portion 220 is fully closed, the rotational retention hooks 275 engage their respective receptacles. Alternatively, the rotational retention hooks 275 may be spring loaded and shaped such that when the top portion 220 is fully closed, the rotational retention hooks 275 are displaced by an upper portion of their respective receptacles and are engaged into the receptacle by the spring loading when the rotational retention hook 275 passes the upper portion of the receptacle resulting from the closing motion of the top portion 220.

Figure 3:
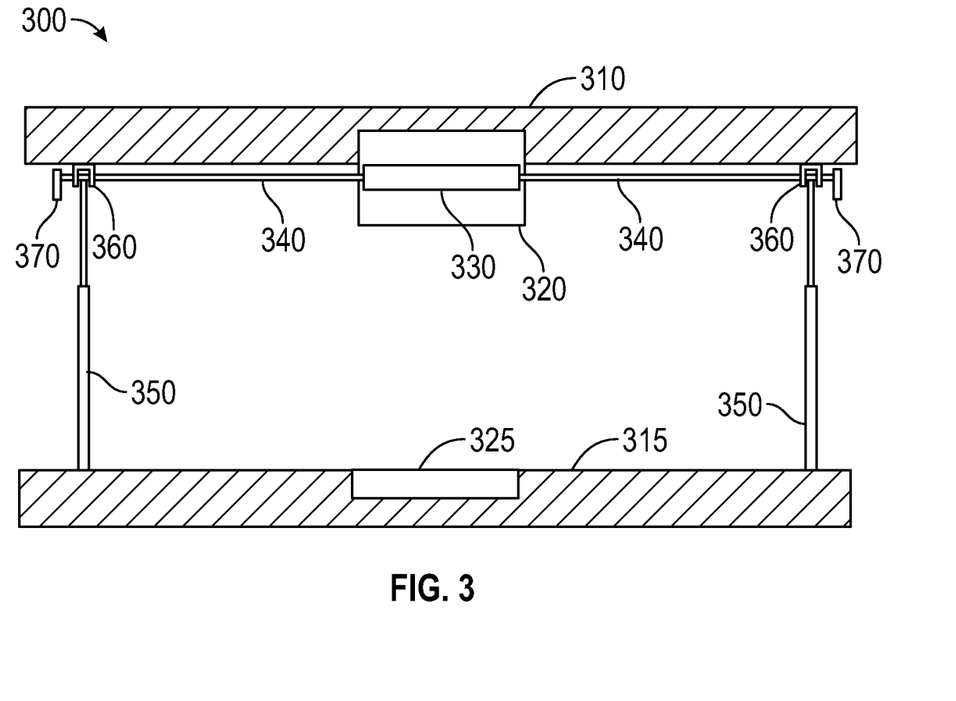
FIG. 3 shows an exemplary bed support with interior storage according to an exemplary embodiment.

Turning now to FIG. 3, an exemplary bed support 300 with interior storage according to an exemplary embodiment of the current disclosure is shown. The exemplary bed support 300 includes a top portion 310 and a bottom portion 315. In this exemplary embodiment, the bottom portion 315 is configured such that an interior storage volume is provided within the bottom portion 315. When the top portion 310 is lowered completely, the top portion 310 and the bottom portion 315 are then configured such that the interior storage volume is enclosed and any objects within the interior storage volume are securely contained.

The exemplary bed support 300 further includes a latch mechanism 320 for opening and closing the top portion 310. In this exemplary embodiment, the latch mechanism 320 may include a lever 330 which may be actuated upwards, thereby allowing the top portion 310 to be raised, or the lever 330 may be actuated downwards to allow the top portion 310 to be lowered. When actuated, the lever 330 is operative to rotate one or more rotational shafts 340. Rotation of the rotational shafts 340 results in an engagement of a release of a locking valve 360 for one or more gas struts 350. In one exemplary embodiment, the locking valve 360 may include a release pin located in the end of the piston rod of the gas struts 350. When the release pin is depressed, the gas struts 350 are no longer locked and the top portion 310 may then be repositioned and as a result the gas struts 350 are extended or compressed. When the lever 330 is released, the release pin is no longer depressed by the rotational shaft 340 and the locking valves 360 of the gas struts 350 are engaged, the top portion 310 is then constrained at its current position. The exemplary bed support 300 may further include one or more retention hooks 370 mounted to the rotational shafts 340. When the lever 330 is lifted, the retention hooks 370 may be rotated and released from a retention socket, receptacle, or retention pin. The retention hooks 370 may be further configured to automatically engage the retention socket when the top portion 310 is completely lowered to the lower portion 315 using a spring loaded hook mechanism or the like. In another exemplary embodiment, the lower portion 315 may include a recess 325, such as an indentation or depression for receiving a lower portion of the latch mechanism 320 when the top portion 310 is fully lowered to the lower portion 315.

Figure 4:
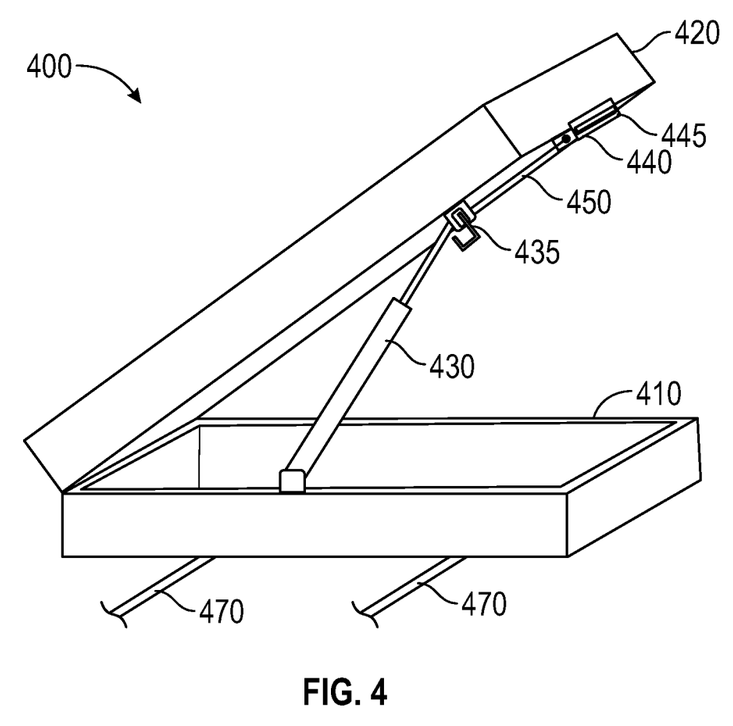
FIG. 4 shows an implementation of a system for an exemplary bed support with interior storage according to another exemplary embodiment.

Turning now to FIG. 4, a diagram illustrating another exemplary implementation of a system 400 for an exemplary bed support with interior storage is shown. The exemplary system 400 may include a lower portion 410, an upper portion 420, a locking gas strut 430, a locking mechanism 435, a latch mechanism 440, a rotational lever 445, a rotational member, and a seat track 470.

In this exemplary embodiment, the lower portion 410 may form a storage volume for storing loose items within an aircraft. For example, when the exemplary system 400 is used as a bed support for supporting a mattress in an aircraft, the storage volume may be used to store linens, pillows, and the like. The lower portion 410 may include a bottom and a plurality of sides wherein the bottom and the plurality of sides define a storage volume. In an exemplary embodiment, the lower portion 410 is secured within the aircraft by attaching the bottom of the lower portion 410 to one or more seat tracks 470 within the aircraft.

The exemplary system 400 further includes an upper portion 420 rotationally coupled to one of the plurality of sides where the upper portion 420 is configured to enclose the storage volume when the upper portion 420 is positioned in a closed position and to provide access to the storage volume when the upper portion 420 is in an open position. The upper portion 420 may further be used as a mattress support wherein a mattress is mechanically coupled to an outer side of the upper portion 420, such that when the upper portion 420 is in the closed position, the exemplary system 400 forms a bed support for supporting the mattress such that the mattress is retained a desirable distance from the aircraft passenger compartment floor.

The exemplary system 400 further includes a locking gas strut 430 coupled between the upper portion 420 and the lower portion 410 having a locking mechanism 435 wherein the locking gas strut 430 is locked when the locking mechanism 435 is engaged and the locking gas strut 430 is unlocked when the locking mechanism 435 is disengaged. The exemplary system 400 may include two locking gas struts 430, one on each of the sides of the storage volume adjacent to the side at which the upper portion 420 is rotationally coupled to the lower portion 410. In this exemplary embodiment, each of the locking gas struts 430 may include a locking mechanism 435 or alternatively, only one of the locking gas struts 430 may include a locking mechanism 435.

The exemplary system 400 further includes a latch mechanism 440 coupled to the upper portion 420 configured with a rotational lever 445 wherein the rotational lever 445 is operative to rotate in an upward direction and a downward direction. A rotational shaft 450 may be coupled to the rotational lever 445 wherein the rotational shaft 450 is operative to disengage the locking mechanism 440 when the rotational lever 445 is rotated in the upward direction and the downward direction.

In accordance with another aspect of the present disclosure the exemplary system 400 may be an aircraft storage container including a lower portion 410 having a horizontal bottom and a plurality of vertical sides configured to form a storage volume wherein the horizontal bottom is mechanically affixed to at least one aircraft seat track 470, an upper portion 420 rotationally coupled to one of the plurality of vertical sides wherein the upper portion 420 forms an upper horizontal side of the storage volume when the upper portion 420 is in a closed position and provides access to the storage volume when the upper portion 420 is in an open position, a gas piston 430 having a locking mechanism 440 wherein the gas piston 430 is coupled between the lower portion 410 and the upper portion 420, the gas piston being configured to support the upper portion 420 when the locking mechanism 435 is engaged, a rotational member 450 operative to disengage the locking mechanism 435 when rotated and to engage the locking mechanism 435 when released, and a latch mechanism 440 having a rotational lever 445, wherein the latch mechanism 440 is operative to rotate the rotational member 450 in response to a pressure on the rotational lever 445.

Figure 5:
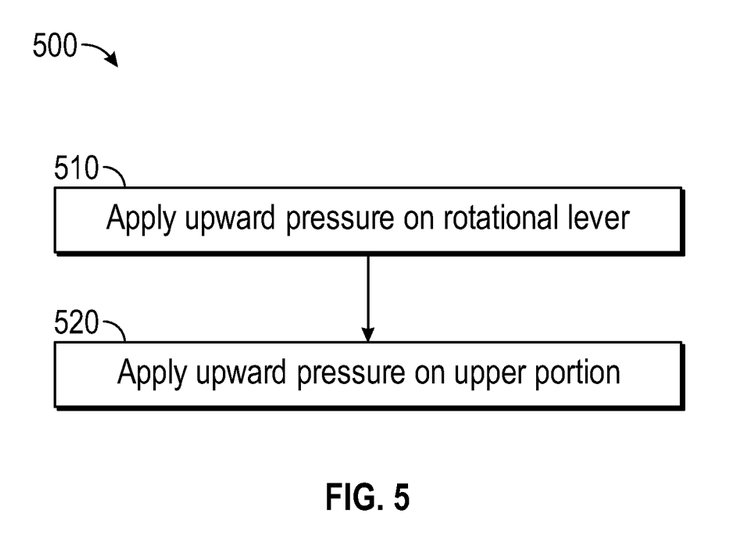
FIG. 5 a flow chart illustrating a method for providing access to an exemplary bed support with interior storage according to another exemplary embodiment.

Turning now to FIG. 5, a flow chart illustrating an exemplary implementation of a method 500 for providing auxiliary port function distinction is shown. In this exemplary embodiment, the method 500 may be performed by an aircraft occupant for opening a storage container having an upper portion and a lower portion. The lower portion may include a bottom and a plurality of sides wherein the bottom and the plurality of sides define a storage volume. The upper portion may be rotationally coupled to one of the plurality of sides where the upper portion is configured to enclose the storage volume when the upper portion is positioned in a closed position and to provide access to the storage volume when the upper portion is in an open position. Movement of the upper portion may be aided by a locking gas strut coupled between the upper portion and the lower portion having a locking mechanism wherein the locking gas strut is locked when the locking mechanism is engaged and the locking gas strut is unlocked when the locking mechanism is disengaged.

The method is first operative for applying 510 an upward pressure to a rotational lever wherein the rotational lever forms a portion of a latch mechanism coupled to the upper portion. In one exemplary embodiment, the rotational lever may be a paddle type lever which is rotational along a horizontal axis parallel to the rotational axis of the upper portion. The rotational lever is coupled to a rotational shaft and rotation of the rotational lever results in a rotational of the rotational shaft around the same axis and in the same direction of the rotational lever. In one exemplary embodiment, the rotational shaft may be coupled to the rotational lever such that the rotational shaft is operative to disengage the locking mechanism when the rotational lever is rotated in the upward direction and the downward direction.

In response to a rotational pressure applied to the rotational lever and disengagement of the locking mechanism, the upper portion may be freely rotated around the rotational coupling with the lower portion. The method is next operative to apply 520 an upward pressure on the upper portion to provide access to the storage volume. The upward pressure may be applied to the rotational lever continuing after the rotational lever has been fully rotated to a stop point within the latching mechanism. Alternatively, upward pressure may be applied to another area or surface of the upper portion. For example, an aircraft occupant may apply an upward force to the rotational lever with a first hand and an upward pressure to another part of the upper portion with a second hand.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A locking aircraft storage compartment comprising:
a lower portion including a bottom and a plurality of sides including a front side, a back side, a left side and a right side, and wherein the bottom and the plurality of sides define a storage volume;
an upper portion, having a front edge and a back edge, the upper portion being rotationally coupled to one of the plurality of sides where the upper portion is configured to enclose the storage volume when the upper portion is positioned in a closed position and to provide access to the storage volume when the upper portion is in an open position;
a locking gas strut coupled between the upper portion and the lower portion having a locking mechanism wherein the locking gas strut is locked when the locking mechanism is engaged and the locking gas strut is unlocked when the locking mechanism is disengaged, wherein the locking mechanism includes a release pin located at an end of the locking gas strut;
a latch mechanism coupled to the front edge of the upper portion configured with a rotational lever wherein the rotational lever is operative to rotate in an upward direction and a downward direction;
a rotational shaft coupled to the rotational lever wherein the rotational shaft is operative to disengage the locking mechanism by depressing the release pin when the rotational lever is rotated in the upward direction and the downward direction and to engage the locking mechanism by releasing the release pin when the rotational lever is released such that when the release pin is depressed, the locking gas strut is not locked and when the release pin is not depressed, the locking gas strut is locked and wherein the locking gas strut provides aid in lifting the top portion by exerting a linear force between the lower portion and the top portion when the locking gas strut is not locked;
a rear retention receptacle coupled to the back side of the lower portion and a fixed retention hook coupled to the back edge of the upper portion such that the fixed retention hook engages the rear retention receptacle when the upper portion is positioned in the closed position and wherein the fixed retention hook disengages the rear retention receptacle when the upper portion is rotated towards the open position; and
a front retention receptacle coupled to the front side of the lower portion and a rotational retention hook coupled to the rotational shaft and where the rotational retention hook is disengaged from the front retention receptacle in response to the rotational lever being rotated in the upward direction.

2. The apparatus of claim 1 a fixed retention hook coupled to the upper portion wherein the fixed retention hook is engaged with the lower portion in response to the upper portion being positioned in the closed position.

3. The apparatus of claim 1 wherein the latch mechanism is affixed to the upper portion on a first edge of the upper portion opposite to a second edge to which the upper portion is rotationally coupled to the lower portion.

4. The apparatus of claim 1 wherein the upper portion is configured to support a mattress and wherein the mattress is affixed to a side of the upper portion opposite to the storage volume.

5. The apparatus of claim 1 wherein the rotational lever includes a lower surface and an upper surface and wherein the rotational lever is rotated upwards in response to a pressure on the lower surface and wherein the rotational lever is rotated downwards in response to a pressure on the upper surface.

6. The apparatus of claim 1 wherein the apparatus is a bed support within an aircraft.

7. The apparatus of claim 1 wherein the lower portion is affixed to an aircraft seat track with at least one station fitting.

8. An aircraft storage container comprising:
a lower portion having a horizontal bottom and a plurality of vertical sides including a front side, a back side, a left side and a right side, configured to form a storage volume wherein the horizontal bottom is mechanically affixed to at least one aircraft seat track;
an upper portion, having a front edge and a back edge, the upper portion being rotationally coupled to one of the plurality of vertical sides wherein the upper portion forms an upper horizontal side of the storage volume when the upper portion is in a closed position and provides access to the storage volume when the upper portion is in an open position;
a gas piston having a locking mechanism wherein the gas piston is coupled between the lower portion and the upper portion, the gas piston being configured to support the upper portion when the locking mechanism is engaged;
a rotational member operative to disengage the locking mechanism when rotated and to engage the locking mechanism when the rotational member is released;
a rotational retention hook coupled to the rotational member wherein the rotational retention hook is engaged with a front retention receptacle coupled to the front side of the lower portion when the upper portion is in the closed position, the rotational retention hook being disengaged from the front retention receptacle in response to a rotation of the rotational member;
a fixed retention hook rigidly affixed to the back edge of the upper portion such that the fixed retention hook engages a rear retention receptacle coupled to the back side of the lower portion when the upper portion is positioned in the closed position and wherein the fixed retention hook disengages the rear retention receptacle when the upper portion is rotated towards the open position; and
a latch mechanism having a rotational lever, wherein the latch mechanism is operative to rotate the rotational member in response to a pressure on the rotational lever and wherein the rotational lever is coupled to the rotational member such that the rotational member is operative to disengage the locking mechanism when the rotational lever is rotated in the upward direction and the downward direction and to engage the locking mechanism when the rotational lever is released and wherein the gas piston provides aid in lifting the top portion by exerting a linear force between the lower portion and the top portion when the gas piston is not locked.

9. The aircraft storage container of claim 8, wherein the gas piston is one of a plurality of gas pistons coupled between the upper portion and the lower portion and wherein the rotational member is one of a plurality of rotational members each for disengaging one of the plurality of gas pistons.

* * * * *